US011892629B2

(12) United States Patent
Kim et al.

(10) Patent No.: US 11,892,629 B2
(45) Date of Patent: *Feb. 6, 2024

(54) HOLOGRAPHIC VIRTUAL REALITY DISPLAY

(71) Applicant: NVIDIA Corporation, Santa Clara, CA (US)

(72) Inventors: Jonghyun Kim, San Jose, CA (US); Ward Lopes, Redwood City, CA (US); David Patrick Luebke, Charlottesville, VA (US); Manu Gopakumar, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/670,337

(22) Filed: Feb. 11, 2022

(65) Prior Publication Data
US 2022/0334395 A1  Oct. 20, 2022

Related U.S. Application Data

(60) Provisional application No. 63/176,108, filed on Apr. 16, 2021.

(51) Int. Cl.
*G02B 27/01* (2006.01)
*G03H 1/22* (2006.01)
(Continued)

(52) U.S. Cl.
CPC ............ *G02B 27/0103* (2013.01); *G02B 7/04* (2013.01); *G02B 27/0172* (2013.01);
(Continued)

(58) Field of Classification Search
CPC .. G02B 27/0103; G02B 7/04; G02B 27/0172; G02B 2027/0174; G02B 2027/0178;
(Continued)

(56) References Cited

U.S. PATENT DOCUMENTS 10,254,542 B2 * 4/2019 Kollin ................ G03B 21/2066
10,423,222 B2 * 9/2019 Popovich .............. G02F 1/2955
(Continued)

OTHER PUBLICATIONS

Akeley et al., "A Stereo Display Prototype with Multiple Focal Distances," SIGGRAPH, Aug. 1, 2004, pp. 804-813.
(Continued)

*Primary Examiner* — Dmitriy Bolotin
(74) *Attorney, Agent, or Firm* — Zilka-Kotab, P.C.

(57) ABSTRACT

Virtual reality (VR) displays are computer displays that present images or video in a manner that simulates a real experience for the viewer. In many cases, VR displays are implemented as head-mounted displays (HMDs) which provide a display in the line of sight of the user. Because current HMDs are composed of a display panel and magnifying lens with a gap therebetween, proper functioning of the HMDs limits their design to a box-like form factor, thereby negatively impacting both comfort and aesthetics. The present disclosure provides a different configuration for a VR display which allows for improved comfort and aesthetics, including specifically at least one coherent light source, at least one pupil replicating waveguide coupled to the at least one coherent light source to receive light therefrom, and at least one spatial light modulator coupled to the at least one pupil replicating waveguide to modulate the light.

26 Claims, 10 Drawing Sheets

(51) Int. Cl.
   *G02B 7/04*    (2021.01)
   *G06F 3/01*    (2006.01)
   *G06T 19/00*   (2011.01)

(52) U.S. Cl.
   CPC ........... *G03H 1/2294* (2013.01); *G06F 3/013* (2013.01); *G06T 19/006* (2013.01); *G02B 2027/0174* (2013.01); *G02B 2027/0178* (2013.01); *G03H 2223/16* (2013.01); *G03H 2223/19* (2013.01); *G03H 2223/22* (2013.01)

(58) Field of Classification Search
   CPC .............. G02B 27/0081; G02B 27/286; G02B 27/4272; G02B 2027/015; G03H 1/2294; G03H 2223/16; G03H 2223/19; G03H 2223/22; G03H 2223/20; G03H 2223/17; G03H 2223/23; G03H 1/0808; G06F 3/013; G06T 19/006
   See application file for complete search history.

(56) References Cited

U.S. PATENT DOCUMENTS

| | | | | |
|---|---|---|---|---|
| 10,564,718 | B2* | 2/2020 | Na | G06V 40/193 |
| 10,761,599 | B2* | 9/2020 | Na | H01L 27/1463 |
| 10,983,340 | B2* | 4/2021 | Popovich | G02B 6/0026 |
| 2006/0228073 | A1* | 10/2006 | Mukawa | G02B 5/18 |
| | | | | 385/31 |
| 2013/0100511 | A1* | 4/2013 | Yamamoto | G03H 1/2294 |
| | | | | 359/9 |
| 2013/0308185 | A1* | 11/2013 | Robinson | F21V 13/12 |
| | | | | 359/465 |
| 2014/0285429 | A1* | 9/2014 | Simmons | G02B 27/0179 |
| | | | | 359/259 |
| 2016/0018654 | A1* | 1/2016 | Haddick | G06F 3/011 |
| | | | | 345/8 |
| 2016/0062121 | A1* | 3/2016 | Border | G02B 27/0176 |
| | | | | 359/630 |
| 2016/0349444 | A1* | 12/2016 | Robinson | G02B 6/0091 |
| 2017/0242264 | A1* | 8/2017 | Sissom | H04N 9/3167 |
| 2017/0357101 | A1* | 12/2017 | Tervo | G02B 27/0081 |
| 2018/0052320 | A1* | 2/2018 | Curtis | G02B 6/0016 |
| 2018/0120563 | A1* | 5/2018 | Kollin | G03B 21/005 |
| 2018/0275410 | A1* | 9/2018 | Yeoh | G06T 19/006 |
| 2018/0292053 | A1* | 10/2018 | Minor | F21K 9/61 |
| 2018/0335629 | A1* | 11/2018 | Cheng | G02B 27/30 |
| 2019/0179149 | A1* | 6/2019 | Curtis | G02B 27/0172 |
| 2019/0339449 | A1* | 11/2019 | Shipton | G02B 6/122 |
| 2020/0043391 | A1* | 2/2020 | Maimone | G02B 27/0093 |
| 2020/0049992 | A1* | 2/2020 | Peng | G06F 3/012 |
| 2020/0192130 | A1* | 6/2020 | Maimone | G02B 27/0172 |
| 2020/0292851 | A1* | 9/2020 | Maimone | G02B 6/0035 |
| 2020/0371389 | A1* | 11/2020 | Geng | G02B 5/3025 |
| 2021/0048673 | A1* | 2/2021 | Yan | G02B 26/06 |
| 2021/0048674 | A1* | 2/2021 | Yan | G02F 1/294 |
| 2021/0364808 | A1* | 11/2021 | Koshelev | G02B 5/04 |
| 2022/0187601 | A1* | 6/2022 | Morozov | G02B 27/0081 |
| 2022/0334392 | A1 | 10/2022 | Kim et al. | |
| 2022/0334395 | A1* | 10/2022 | Kim | G03H 1/2294 |
| 2023/0019309 | A1* | 1/2023 | Chriki | G03B 21/147 |

OTHER PUBLICATIONS

Aksit et al., "Slim near-eye display using pinhole aperture arrays," applied optics, vol. 54, No. 11, Apr. 10, 2015, pp. 3422-3427.
Bang et al., "Lenslet VR: Thin, Flat and Wide-FOV Virtual Reality Display Using Fresnel Lens and Lenslet Array," IEEE Transactions on Visualization and Computer Graphics, vol. 27, No. 5, May 2021, pp. 2545-2554.
Cakmakci et al., "Holographic pancake optics for thin and lightweight optical see-through augmented reality," Optics Express, vol. 29, No. 22, Oct. 25, 2021, pp. 35206-35215.
Cakmakci et al., "Head-Worn Displays: A Review," Journal of Displays Technology, vol. 2, No. 3, Sep. 2006, pp. 199-216.
Chakravarthula et al., "Wirtinger Holography for Near-Eye Displays," ACM Transactions on Graphics, vol. 38, No. 6, Nov. 2019, 13 pages.
Chakravarthula et al., "Learned Hardware-in-the-loop Phase Retrieval for Holographic Near-Eye Displays," ACM Transactions on Graphics, vol. 39, No. 6, Dec. 2020, pp. 1-18.
Chang et al., "Toward the next-generation VR/AR optics: a review of holographic near-eye displays from a human-centric perspective," Optica, vol. 7, No. 11, Nov. 2020, pp. 1563-1578.
Chang et al., "Towards Multifocal Displays with Dense Focal Stacks," ACM Transactions on Graphics, vol. 37, No. 6, Nov. 2018, 13 pages.
Choi et al., "Neural 3D Holography: Learning Accurate Wave Propagation Models for 3D Holographic Virtual and Augmented Reality Displays," ACM Transactions on Graphics, vol. 40, No. 6, Dec. 2021, 12 pages.
Dunn et al., "Wide Field of View Varifocal Near-Eye Display Using See-Through Deformable Membrane Mirrors," IEEE Transactions on Visualization and Computer Graphics, Jan. 2017, 11 pages.
Gopakumar et al., "Unfiltered holography: optimizing high diffraction orders without optical filtering for compact holographic displays," Optics Letters, vol. 46, No. 23, Dec. 1, 2021, pp. 5822-5825.
Hua et al., "A 3D integral imaging optical see-through head mounted display," Optics Express, vol. 22, No. 11, Jun. 2, 2014, pp. 13484-13491.
Jang et al., "Holographic Near-eye Display with Expanded Eyebox," ACM Transactions on Graphics, vol. 37, No. 6, Nov. 2018, pp. 1-14.
Jang et al., "Retinal 3D: Augmented Reality Near-Eye Display Via Pupil-Tracked Light Field Projection on Retina," ACM Transactions on Graphics, vol. 36, No. 6, Nov. 2017, pp. 1-13.
Kim et al., "Foveated AR: Dynamically-Foveated Augmented Reality Display," ACM Transactions on Graphics, vol. 38, No. 4, Jul. 2019, pp. 1-15.
Konrad et al., "Novel Optical Configurations for Virtual Reality: Evaluating User Preference and Performance with Focus-tunable and Monovision Near-eye Displays," Proceedings of the 2016 CHI Conference on Human Factors in Computing Systems, May 2016, pp. 1211-1220.
Koulieris et al., "Near-Eye Display and Tracking Technologies for Virtual and Augmented Reality," Eurographics, vol. 38, No. 02, 2019, 28 pages.
Kramida et al., "Resolving the Vergence—Accommodation Conflict in Head Mounted Displays, " preprint, IEEE, 2015, 17 pages, retrieved from https://www-hlb.cs.umd.edu/sites/default/files/scholarly_papers/Kramida.pdf.
Kress, B., "Optical Architectures for Augmented-, Virtual-, and Mixed-Reality Headsets," SPIE Press, 2020, 274 pages.
Lambooij et al., "Visual Discomfort and Visual Fatigue of Stereoscopic Displays: A Review," Journal of Imaging Science and Technology, vol. 53, No. 3, May/Jun. 2009, 14 pages.
Lanman et al., "Near-Eye Light Field Displays," ACM Transactions on Graphics, vol. 32, No. 6, Nov. 2013, 10 pages, retrieved from https://research.nvidia.com/publication/near-eye-light-field-displays-0.
Lee et al., "Recent progress in Pancharatnam-Berry phase optical elements and the applications for virtual/augmented realities," Optical Data Processing and Storage, vol. 3, 2017, pp. 79-88.
Liu et al., "An Optical See-Through Head Mounted Display with Addressable Focal Planes," IEEE International Symposium on Mixed and Augmented Reality, Sep. 2008, pp. 33-42.
Love et al., "High-speed switchable lens enables the development of a volumetric stereoscopic display," Optics Express, vol. 17, No. 18, Aug. 31, 2009, pp. 15716-15725.
Maimone et al., "Pinlight Displays: Wide Field of View Augmented Reality Eyeglasses using Defocused Point Light Sources," ACM Transactions on Graphics,, vol. 33, No. 4, Jul. 2014, pp. 89:1-89:11.
Moon et al., "Compact Augmented Reality Combiner Using Pancharatnam-Berry Phase Lens," IEEE Photonics Technology Letters, vol. 32, No. 5, Mar. 1, 2020, pp. 235-238.

(56) References Cited

OTHER PUBLICATIONS

Nam et al., "Aberration-corrected full-color holographic augmented reality near-eye display using a Pancharatnam-Berry phase lens," Optics Express, vol. 28, No. 21, Oct. 2020, pp. 30836-30850.
Narasimhan, B., "Ultra-Compact pancake optics based on ThinEyes® super-resolution technology for virtual reality headsets," Digital Optics for Immersive Displays, vol. 10676, 2018, 10 pages.
Padmanaban et al., "Optimizing virtual reality for all users through gaze-contingent and adaptive focus displays," PNAS, vol. 114, No. 9, Feb. 28, 2017, pp. 2183-2188.
Padmanaban et al., "Holographic Near-Eye Displays Based on Overlap-Add Stereograms," ACM Transactions on Graphics, vol. 38, No. 6, Nov. 2019, pp. 214:1-214:13.
Pamplona et al., "Photorealistic Models for Pupil Light Reflex and Iridal Pattern Deformation," ACM Transactions on Graphics, vol. 28, No. 4, Aug. 2009, pp. 106:1-106:12.
Peng et al., "Speckle-free holography with partially coherent light sources and camera-in-the-loop calibration," Science Advances, vol. 7, Nov. 12, 2021, pp. 1-6.
Peng et al., "Neural Holography with Camera-in-the-loop Training," ACM Transactions on Graphics, vol. 39, No. 6, Dec. 2020, pp. 185:1-185:14.
Perkinscoie, "2019 Augmented and Virtual Reality Survey Report," PerkinsCoie, 2019, 25 pages, retrieved from https://www.perkinscoie.com/images/content/2/1/v4/218679/2019-VR-ARSurvey-Digital-v1.pdf.
Perkinscoie, "XR Industry Insider 2021 XR Survey: Industry Insights into the Future of Immersive Technology," PerkinsCoie, Jul. 2021, 22 pages, retrieved from https://www.perkinscoie.com/content/designinteractive/xr2021/assets/downloads/XR_Industry_Insider_2021_XR_Survey.pdf.
Ratcliff et al., "ThinVR: Heterogeneous microlens arrays for compact, 180 degree FOV VR near-eye displays," IEEE Transactions on Visualization and Computer Graphics, vol. 26, No. 5, May 2020, pp. 1981-1990.
Rathinavel et al., "An Extended Depth-of-Field Volumetric Near-Eye Augmented Reality Display," IEEE Transactions on Visualization and Computer Graphics, vol. 24, No. 11, Nov. 2018, pp. 2857-2866.
Rolland et al., "Multifocal planes head-mounted displays," Applied Optics, vol. 39, No. 19, Jul. 1, 2000, pp. 3209-3215.
Shibata et al., "The zone of comfort: Predicting visual discomfort with stereo displays," Journal of Vision, vol. 11, 2011, pp. 1-29.
Watson et al., "A unified formula for light-adapted pupil size," Journal of Vision, vol. 12, Sep. 25, 2012, pp. 1-16.
Kiong et al., "Augmented reality and virtual reality displays: emerging technologies and future perspectives," Light: Science & Applications, vol. 10, No. 216, 2021, pp. 1-30.
Yoo et al., "Foveated display system based on a doublet geometric phase lens," Optics Express, vol. 28, No. 16, Aug. 3, 2020, 13 pages.
Zhan et al., "Augmented Reality and Virtual Reality Displays: Perspectives and Challenges," iScience, vol. 23, Aug. 21, 2020, pp. 1-13.
Shi et al., "Towards real-time photorealistic 3D holography with deep neural networks," Nature, vol. 591, Mar. 11, 2021, 20 pages.
Huang et al., "Out-of-plane computer-generated multicolor waveguide holography," Optica, vol. 6, No. 2, Feb. 2019, pp. 119-124.
Maimone et al., "Holographic Optics for Thin and Lightweight Virtual Reality," ACM Transactions on Graphics, vol. 39, No. 4, Article 67, Jul. 2020, pp. 14 pages.
Yeom et al., "3D holographic head mounted display using holographic optical elements with astigmatism aberration compensation," Optics Express, vol. 23, No. 25, Dec. 14, 2015, 10 pages.
Kim et al., U.S. Appl. No. 17/475,081, filed Sep. 14, 2021.
Restriction Requirement from U.S. Appl. No. 17/475,081, dated Jul. 27, 2023.

* cited by examiner

HOLOGRAPHIC VIRTUAL REALITY DISPLAY

RELATED APPLICATION(S)

This application claims the benefit of U.S. Provisional Application No. 63/176,108 titled "VIRTUAL REALITY DISPLAY WITH HOLOGRAPHIC OPTICS," filed Apr. 16, 2021, the entire contents of which is incorporated herein by reference.

TECHNICAL FIELD

The present disclosure relates to virtual reality displays.

BACKGROUND

Virtual reality (VR) displays are computer displays that present images or video in a manner that simulates a real experience for the viewer. For example, VR displays may present a three-dimensional (3D) environment, which may or may not be interactive. VR displays are useful for various applications that employ VR, such as entertainment (e.g. video games), education (e.g. training), and business (e.g. meetings), etc.

In many cases, VR displays are implemented as head-mounted displays (HMDs). HMDs are, by definition, worn on the head of a user to provide a display in the line of sight of the user. By viewing the display, the user is able to experience VR. In an effort to encourage more widespread use of HMDs, it has been important to focus HMD designs on more comfortable form factors, higher performance, and improved aesthetics.

To date, however, the typical configuration of HMDs limits their comfort and aesthetics. In particular, a HMD is currently composed of a display panel and magnifying lens (i.e. eye piece). In order to provide a perceptible image to the user, the distance between the display panel and the lens should be slightly smaller than the focal length of the lens. Since it is not feasible to make a very short focal length lens in a given aperture size, current HMDs have a box-like form factor and accordingly do not replicate the traditional form of eye glasses, which negatively impacts both their comfort and aesthetics.

There is a need for addressing these issues and/or other issues associated with the prior art.

SUMMARY

An apparatus and associated method are disclosed for a holographic virtual reality (VR) display. The VR display includes at least one coherent light source, at least one pupil replicating waveguide coupled to the at least one coherent light source to receive light therefrom, and at least one spatial light modulator coupled to the at least one pupil replicating waveguide to modulate the light.

DETAILED DESCRIPTION

Figure 1:
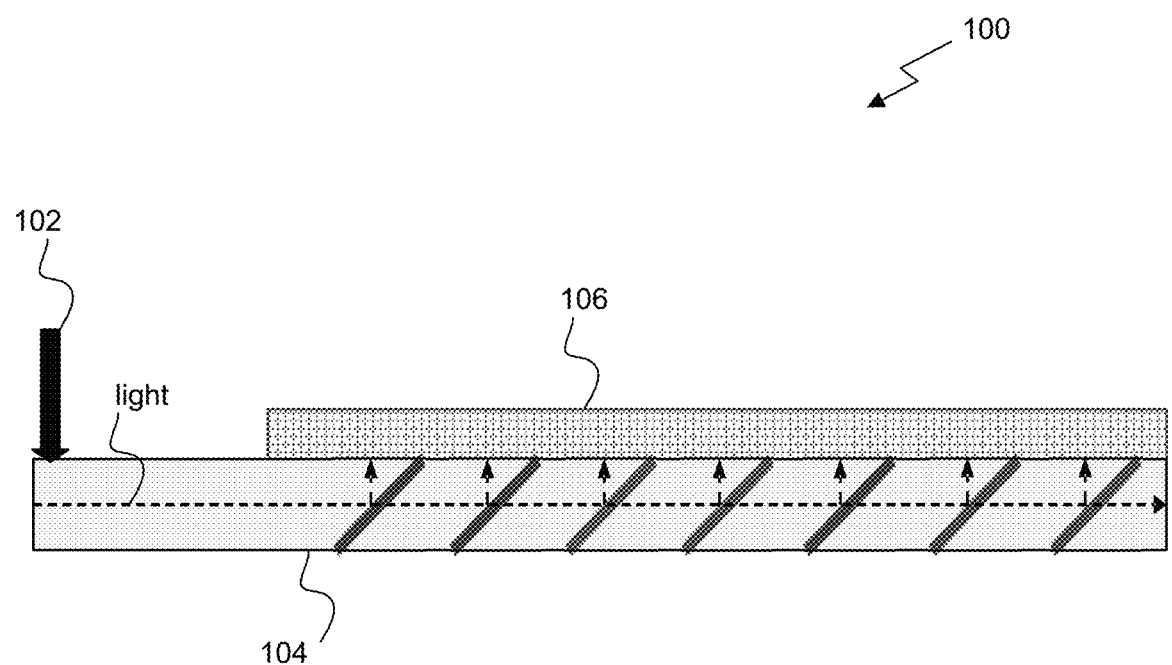
FIG. 1 illustrates a VR display having a coherent light source, a pupil replicating waveguide, and a spatial light modulator, in accordance with an embodiment.

FIG. 1 illustrates a VR display 100 having a coherent light source, a pupil replicating waveguide, and a spatial light modulator, in accordance with an embodiment. In the context of the present description, the VR display 100 is a device configured to display VR images and/or VR video for viewing by a user. In one embodiment, the VR display 100 may be an HMD capable of being worn on a head of the user to provide the display in the line of sight of the user, or the VR display 100 may be a sub-component of such an HMD.

As shown, the VR display 100 includes at least one coherent light source 102, at least one pupil replicating waveguide 104, and at least one spatial light modulator 106. While these elements of the VR display 100 are described below as being coupled (and shown to be directly coupled), at least in part, to one another, it should be noted that in the context of the present description, the term "coupled" may refer to any direct coupling (i.e. with nothing therebetween), any indirect coupling (i.e. with one or more elements or space situated therebetween), partial coupling, completing coupling, and/or any other coupling capable of connecting different elements. Any gaps or space between elements may be unfilled (e.g. composed of air) or may be filled with some substance, such as an anti-reflective coating.

Also in the context of the present description, a coherent light source 102 refers to any light source that is capable of outputting light of any type (e.g. plain, encoded with data, etc.) that is at least partially coherent (e.g. only partially coherent, completely coherent, etc.). Coherent light may refer to a beam of photons that, at least in part, have the same frequency, such as a laser beam output by a laser source. In one embodiment, the VR display 100 may include a single coherent light source 102, optionally with the capability to output light in a plurality of different colors. In another embodiment, the VR display 100 may include a plurality of coherent light sources 102, each capable of outputting light in a different color. In the case of a plurality of coherent light sources 102, the coherent light sources 102 may be time-multiplexed such that light is output by the coherent light sources 102 in a time-multiplexed manner.

In one embodiment, the coherent light source 102 may include a point light source that emits the light, a concave mirror that reflects the light emitted by the point light source, and a beam splitter that directs the light reflected by the concave mirror.

The coherent light source 102 is coupled to at least one pupil replicating waveguide 104 such that the at least one pupil replicating waveguide 104 receives light from the coherent light source 102. For example, the aforementioned beam splitter may direct the light reflected by the concave mirror to the pupil replicating waveguide 104. In the context of the present description, a pupil replicating waveguide 104 refers to any waveguide (which may include a lightguide) that includes at least one light replicating element or function. For example, the pupil replicating waveguide 104 may use the at least one light replicating element or function to replicate the light received from the coherent light source 102 (e.g. as shown by the arrows in FIG. 1 replicating the light received from the coherent light source 102 at an output of the pupil replicating waveguide 104).

In one embodiment, the at least one pupil replicating waveguide 104 may include a diffractive surface grating (or DOE) waveguide, a holographic volume grating (or HOE) waveguide, a partial mirror based waveguide, among other possible waveguides with at least one light replicating element or function. In another embodiment, the at least one pupil replicating waveguide 104 may include a pupil replicating waveguide with at least one waveguide coupler. For example, the at least one pupil replicating waveguide 104 may include a pupil replicating waveguide with a waveguide in-coupler and a waveguide out-coupler. The waveguide in-coupler may refract light received from the coherent light source 102 to cause it to travel through the pupil replicating waveguide 104 to the waveguide out-coupler which may in turn direct the light towards the at least one spatial light modulator 106, again as described in more detail later.

In any case, the pupil replicating waveguide 104 may be configured such that coherence of the light output by the coherent light source 102 is maintained, at least in part, when traveling through the pupil replicating waveguide 104. Additionally, the pupil replicating waveguide 104 may be configured such that polarization of the light output by the coherent light source 102 is maintained, at least in part, when traveling through the pupil replicating waveguide 104. Further, the pupil replicating waveguide 104 may be configured such that a direction of the light input to the pupil replicating waveguide 104 (which may be perpendicular to the pupil replicating waveguide 104 or at any other angle with respect to the pupil replicating waveguide 104), when output by the pupil replicating waveguide 104, is maintained at least in part.

The at least one pupil replicating waveguide 104 is coupled to at least one spatial light modulator 106 to modulate the light. In the context of the present description, a spatial light modulator 106 refers to any device or component that at least partially spatially varies a modulation of light (i.e. changes a property of the light with a spatial pattern). Accordingly, the spatial light modulator 106 may impose, at least in part, a spatially varying modulation on the light transmitted (e.g. output) by the pupil replicating waveguide 104. For example, the spatial light modulator 106 may be a phase-only spatial light modulator or a spatial light modulator operating in a phase-only mode. In one embodiment, the at least one spatial light modulator 106 may be directly coupled to the at least one pupil replicating waveguide 104 with no space (i.e. gap) therebetween. In one embodiment, the at least one spatial light modulator 106 may be indirectly coupled to the at least one pupil replicating waveguide 104 with a space (and/or some other material or component) therebetween.

The spatial light modulator 106 may be the display plane of the VR display 100. In an embodiment, the spatial light modulator 106 may create the VR image or video behind the spatial light modulator 106 (from the point of view of an eye of the user of the VR display 100). In another embodiment, the spatial light modulator 106 may be a reflective spatial light modulator 106. In an embodiment, the spatial light modulator 106 is driven using pixel data received from an image source. As an option, a receiver of the VR display 100 may receive the pixel data from a remote source. Of course, in another embodiment the pixel data may be generated locally with respect to the VR display 100.

By this configuration of the VR display 100, any gap between the at least one pupil replicating waveguide 104 and at least one spatial light modulator 106 may be reduced or eliminated. As a result, a cross-sectional thickness of the VR display 100, or in particular a combined cross-sectional thickness of the at least one pupil replicating waveguide 104 and the at least one spatial light modulator 106, may be 2.5 millimeters (mm). In an embodiment, the cross-sectional thickness of the VR display 100, or in particular a combined cross-sectional thickness of the at least one pupil replicating waveguide 104 and the at least one spatial light modulator 106, may be less than 5 millimeters (mm). In another embodiment, the cross-sectional thickness of the VR display 100, or in particular a combined cross-sectional thickness of the at least one pupil replicating waveguide 104 and the at least one spatial light modulator 106, may be less than 4 mm. In still other embodiments, such combined cross-sectional thickness may be less than 3 mm, etc.

Furthermore, even with the reduced or eliminated gap mentioned above, the quality of VR images and/or video displayed by the VR display 100 may be improved with regard to traditional VR displays. In one embodiment, this may be achieved by using a coherent light source 102 with a coherent length that is larger than a length of the spatial light modulator 106, thereby ensuring light interference. Still yet, the above described configuration of the VR display 100 may support three-dimensional (3D) VR images and/or video. For example, the spatial light modulator 106 may be capable of displaying 3D images and/or video behind the spatial light modulator 106 plane (virtual).

As an option, the VR display 100 may be configured such that the light is not polarized. As another option, the VR display 100 may be configured such that the light is polarized. As yet another option, the VR display 100 may not necessarily include a beam splitter. As still yet another option, the VR display 100 may be filterless, and for example may rely on a propagation pipeline (algorithm) that uses simulation to determine a phase and amplitude to be used by the spatial light modulator 106, or for example may rely on a phase generalization algorithm that considers a pupil diameter effect, which are both described in more detail below.

It should be noted that while VR display 100 is described above as including a coherent light source 102, a pupil replicating waveguide 104, and a spatial light modulator 106, other embodiments are contemplated in which a VR display includes additional elements. FIGS. 2-7 described below provide other possible embodiments (implementations) of a VR display. Just by way of example, in one embodiment, a VR display may include at least one polarizer, which may be a linear polarizer (e.g. see at least FIG. 2). In another embodiment, a VR display may include at least one lens, such as a geometric phase lens (e.g. see at least FIG. 3). In yet another embodiment, a VR display may include at least one polarizer or quarter wave plate used in combination with the lens (e.g. see at least FIG. 4). In still yet another embodiment, a VR display may include a combination of the linear polarizer, the geometric phase lens, and the quarter wave plate (e.g. see at least FIG. 5). In a further embodiment, a VR display may include a dynamic eye box (e.g. see at least FIG. 6B). Moreover, FIG. 8 describes a method of operation of an HMD configured according to one or more of the embodiments described herein.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described. For example, in one embodiment, the VR display 100 may include a receiver that receives pixel data (e.g. representing the VR images or VR video) from a remote source over a network, for display via the VR display 100. The remote source may be any computer system capable of transmitting the pixel data to the VR display 100 via the network. For example, the remote source may be a server, video game console, mobile device (e.g. of a user), or any other computer system, such as that described below with reference to FIG. 9. The VR display 100 may use a wired or wireless connection to the network in order to receive the pixel data from the remote source.

Figure 2:
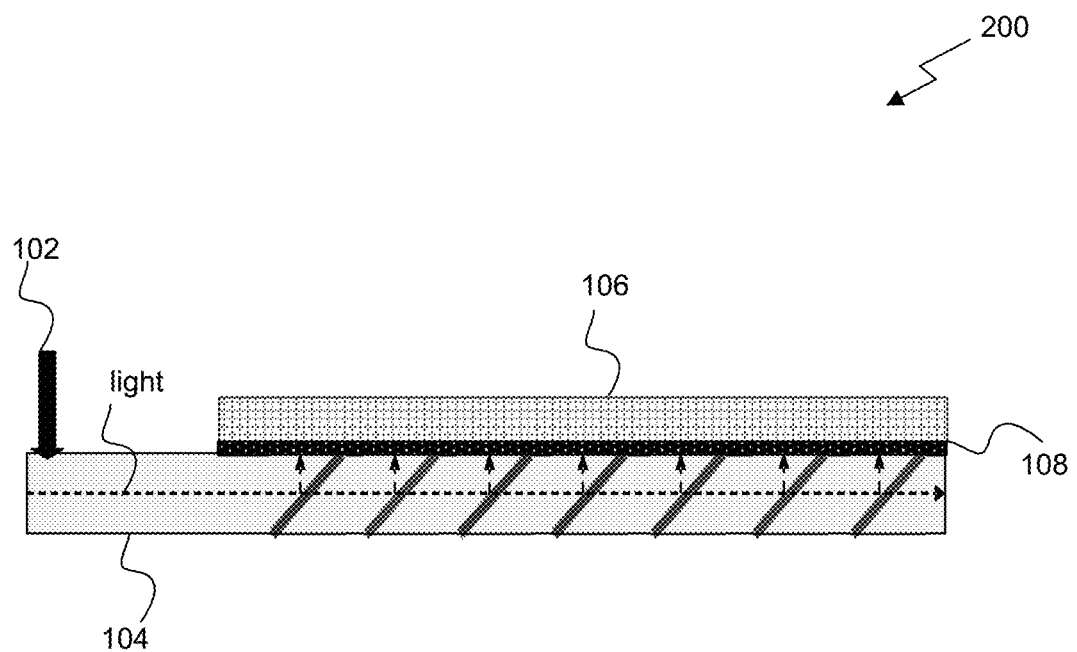
FIG. 2 illustrates an implementation of a VR display having a coherent light source, a pupil replicating waveguide, a spatial light modulator, and a linear polarizer, in accordance with an embodiment.

FIG. 2 illustrates an implementation 200 of a VR display having a coherent light source, a pupil replicating waveguide, a spatial light modulator, and a linear polarizer, in accordance with an embodiment. It should be noted that the aforementioned definitions and/or description may equally apply to the description below.

As shown, at least one pupil replicating waveguide 104 is coupled to at least one coherent light source 102 to receive light therefrom. Additionally, at least one linear polarizer 108 is coupled between the pupil replicating waveguide 104 and at least one spatial light modulator 106. The at least one linear polarizer 108 polarizes the light output from the pupil replicating waveguide 104. In an embodiment, the at least one linear polarizer 108 polarizes the light in accordance with a polarization of the at least one spatial light modulator 106. Of course, while a linear polarizer 108 is shown, it should be noted that other types of polarizers, which refer to a component or device that polarizes light in accordance with some predefined polarization) may be utilized. In other embodiments described herein, a polarizer may not necessarily be used in combination with the spatial light modulator 106, particularly where the light output by the pupil replicating waveguide 104 aligns with the polarization of the spatial light modulator 106 or where the spatial light modulator 106 does not require any particular polarization of the light in order to operate as intended.

In the present embodiment, light is transmitted by the at least one coherent light source 102 through the at least one pupil replicating waveguide 104. The light output by the at least one pupil replicating waveguide 104 is in turn transmitted through the linear polarizer 108 to the spatial light modulator 106 for modulation thereof. The modulated light output by the spatial light modulator 106 is then transmitted for output to the eye of the user.

Figure 3:
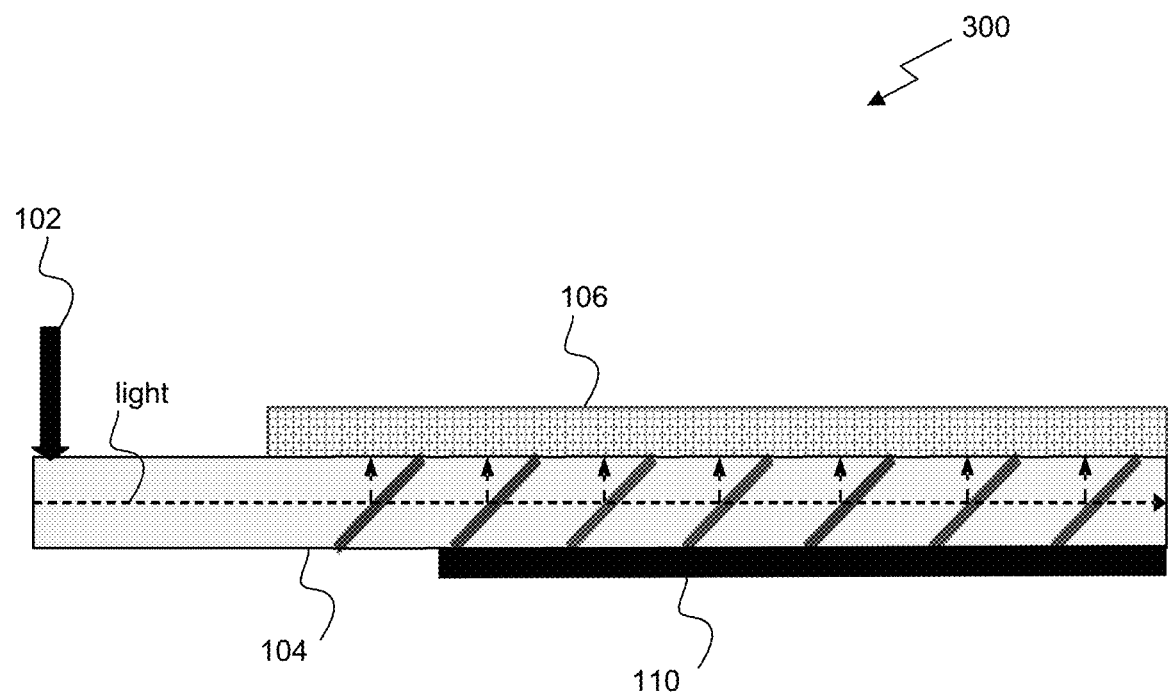
FIG. 3 illustrates an implementation of a VR display having a coherent light source, a pupil replicating waveguide, a spatial light modulator, and a geometric phase lens, in accordance with an embodiment.

FIG. 3 illustrates an implementation 300 of a VR display having a coherent light source, a pupil replicating waveguide, a spatial light modulator, and a geometric phase lens, in accordance with an embodiment. It should be noted that the aforementioned definitions and/or description may equally apply to the description below.

As shown, at least one pupil replicating waveguide 104 is coupled to at least one coherent light source 102 to receive light therefrom. The at least one pupil replicating waveguide 104 is coupled to at least one spatial light modulator 106 to modulate the light. The at least one spatial light modulator 106 is further coupled to at least one geometric phase lens 110. In the embodiment shown, the at least one spatial light modulator 106 is coupled to a first face of the at least one pupil replicating waveguide 104 to modulate the light. Further, with respect to the present embodiment, the at least one geometric phase lens 110 is coupled to a second face of the at least one pupil replicating waveguide 104 that is opposite the first face of the at least one pupil replicating waveguide 104.

The at least one geometric phase lens 110 may be an element of the VR display that is viewed by the eye of a user of the VR display (i.e. may be an eyepiece of the VR display). In particular, in the present embodiment, the modulated light may be transmitted from the at least one spatial light modulator 106 to the at least one geometric phase lens 110 for output to the eye of the user of the VR display. The at least one geometric phase lens 110 may polarize the light, in an embodiment. In another embodiment, the at least one geometric phase lens 110 may create a virtual image that appears to be at a greater distance from the user.

In an embodiment, the geometric phase lens 110 may be a Pancharatnam-Berry phase lens. In an embodiment, the geometric phase lens 110 may be a polarization-dependent liquid crystal lens that works as a positive lens for certain input beam polarization. Of course, while a geometric phase lens 110 is shown, it should be noted that other types of lenses may be utilized. In other embodiments described herein, a lens may not be used in combination with the spatial light modulator 106.

In the present embodiment, light is transmitted by the at least one coherent light source 102 through the at least one pupil replicating waveguide 104. The light output by the at least one pupil replicating waveguide 104 is in turn transmitted to the spatial light modulator 106 for modulation thereof. The modulated light output by the spatial light modulator 106 is then transmitted through the geometric phase lens 110 for output to the eye of the user.

Figure 4:
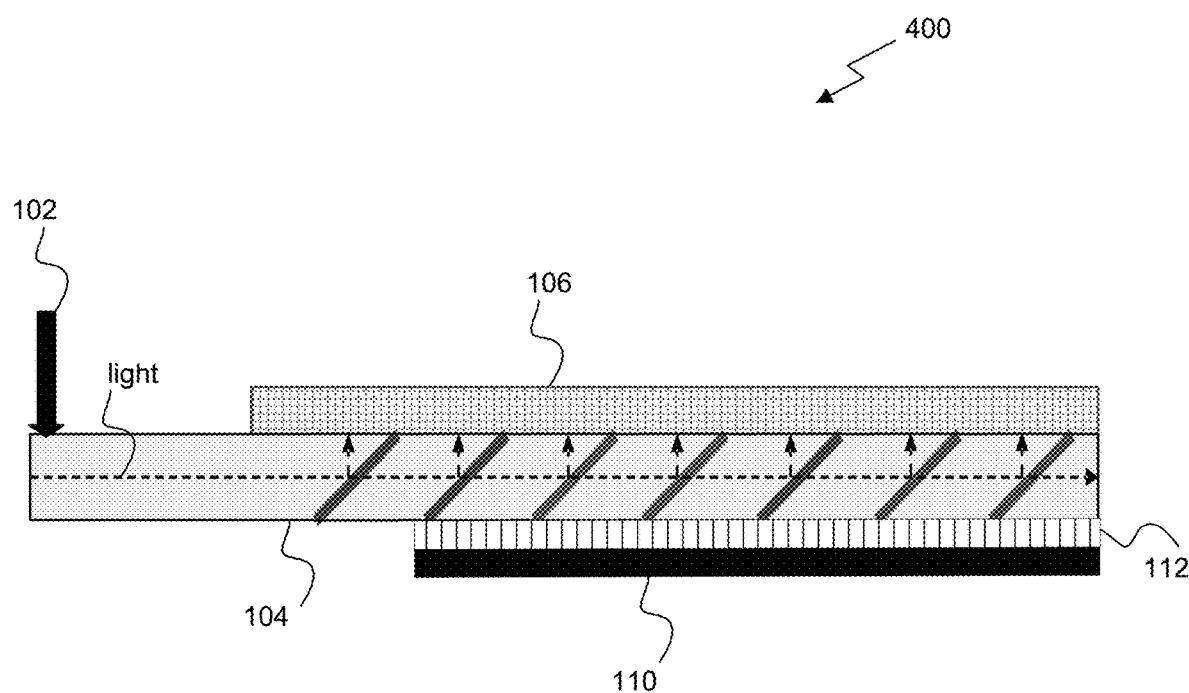
FIG. 4 illustrates an implementation of a VR display having a coherent light source, a pupil replicating waveguide, a spatial light modulator, a geometric phase lens, and a quarter wave plate, in accordance with an embodiment.

FIG. 4 illustrates an implementation 400 of a VR display having a coherent light source, a pupil replicating waveguide, a spatial light modulator, a geometric phase lens, and a quarter wave plate, in accordance with an embodiment. It should be noted that the aforementioned definitions and/or description may equally apply to the description below.

Similar to implementation 300 of FIG. 3, at least one pupil replicating waveguide 104 is coupled to at least one coherent light source 102 to receive light therefrom. The at least one pupil replicating waveguide 104 is coupled to at least one spatial light modulator 106 to modulate the light. The at least one spatial light modulator 106 is further coupled (indirectly) to at least one geometric phase lens 110. In the present embodiment, additionally, at least one quarter wave plate 112 is situated (coupled) between the spatial light modulator 106 and the geometric phase lens 110. The quarter wave plate 112 shifts a phase of the light that is received from the spatial light modulator 106 prior to the light being transmitted to the geometric phase lens 110.

In an embodiment, the quarter wave plate 112 is coupled between the spatial light modulator 106 and the geometric phase lens 110 so that linearly polarized diffracted light can be efficiently transformed to right-handed circularly polarized light (as required by the geometric phase lens 110), and then in turn the light will be left-handed circularly polarized by the geometric phase lens 110. It should be noted that while a quarter wave plate 112 is shown, a polarizer may be utilized in other embodiments. Of course, in yet other embodiments no polarizer or geometric phase lens 110 may necessarily be used in combination with the geometric phase lens 110.

In the present embodiment, light is transmitted by the at least one coherent light source 102 through the at least one pupil replicating waveguide 104. The light output by the at least one pupil replicating waveguide 104 is in turn transmitted through to the spatial light modulator 106 for modulation thereof. The modulated light output by the spatial light modulator 106 is then transmitted through the quarter-wave plate 112 and in turn through the geometric phase lens 110 for output to the eye of the user.

Figure 5:
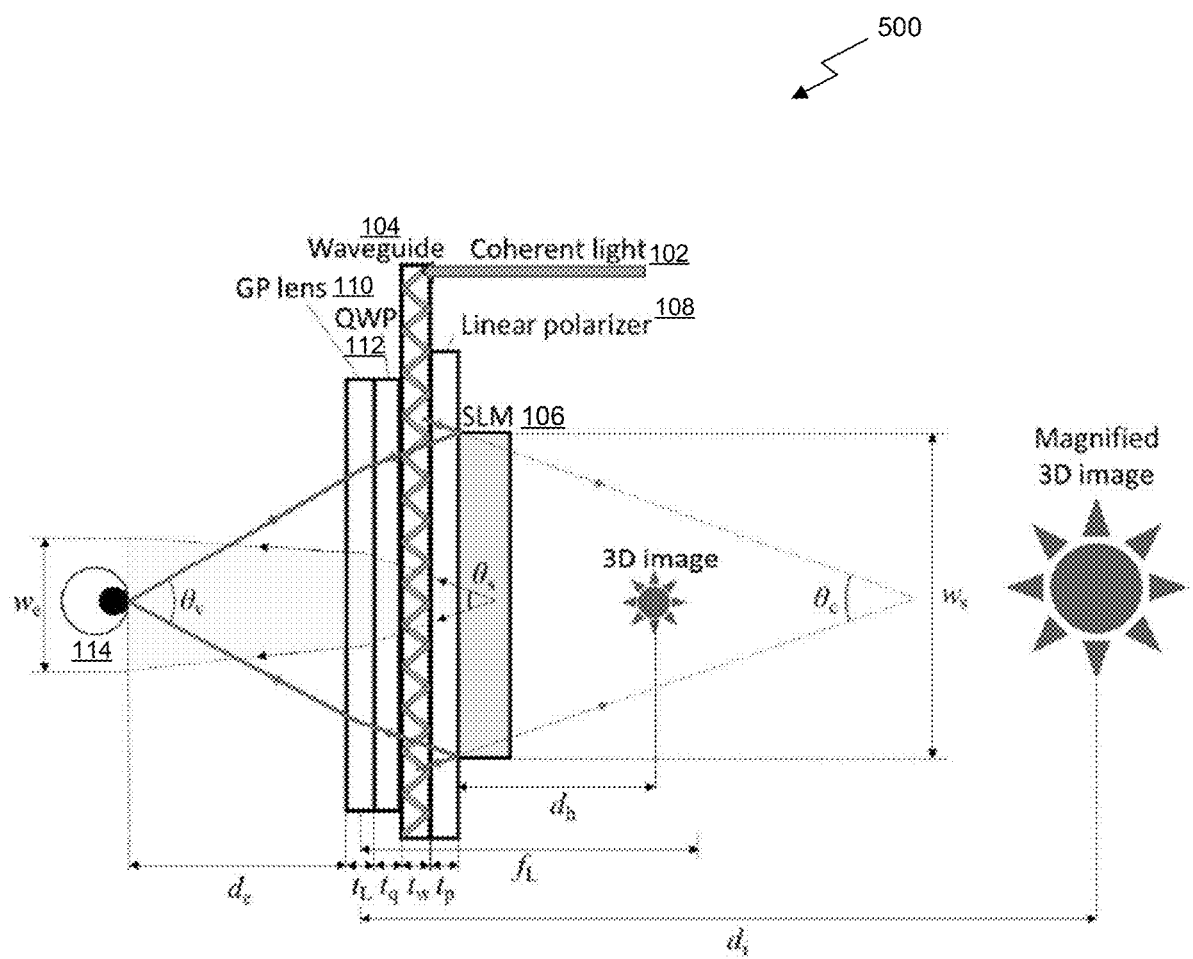
FIG. 5 illustrates an implementation of a VR display having a coherent light source, a pupil replicating waveguide, a spatial light modulator, a linear polarizer, a geometric phase lens, and a quarter wave plate, in accordance with an embodiment.

FIG. 5 illustrates an implementation 500 of a VR display having a coherent light source, a pupil replicating waveguide, a spatial light modulator, a linear polarizer, a geometric phase lens, and a quarter wave plate, in accordance with an embodiment. It should be noted that the aforementioned definitions and/or description may equally apply to the description below.

As shown, at least one pupil replicating waveguide 104 is coupled to at least one coherent light source 102 to receive light therefrom. Additionally, at least one spatial light modulator 106 is indirectly coupled to a first face of the at least one pupil replicating waveguide 104 to modulate the light. Situated (coupled) between the at least one spatial light modulator 106 and the at least one pupil replicating waveguide 104 is a linear polarizer 108.

The at least one spatial light modulator 106 is further coupled (indirectly) to at least one geometric phase lens 110. In particular, at least one quarter wave plate 112 is situated (coupled) between the spatial light modulator 106 and the geometric phase lens 110. The quarter wave plate 112 shifts a phase of the light that is received from the spatial light modulator 106 and that is input to the geometric phase lens 110.

In the present embodiment, light is transmitted by the at least one coherent light source 102 through the at least one pupil replicating waveguide 104. The light output by the at least one pupil replicating waveguide 104 is in turn transmitted through the linear polarizer 108 to the spatial light modulator 106 for modulation thereof. The modulated light output by the spatial light modulator 106 is then transmitted through the quarter-wave plate 112 and in turn through the geometric phase lens 110 for output to the eye 114 of the user. As shown, the target plane is located behind the spatial light modulator 106 with respect to the position of the eye 114 of the user.

The present embodiment shows that the coherent and collimated light with wavelength λ is in-coupled and traveled through a pupil-replicating waveguide 104 with thickness $t_w$, and then it is out-coupled with a converging angle $\theta_c$. After, the light is polarized at the linear polarizer 108 with thickness $t_p$, and the light is modulated at the spatial light modulator 106 where its pixel pitch is $p_s$, where the pixel number is $N_x \times N_y$, the width is $w_s$, and the height is $h_s$.

With the diffraction angle $\theta_s$, the modulated light passes through the pupil-replicating waveguide 104 again, then a through a quarter-wave plate 112 with the thickness $t_q$, and then refracted at the geometric phase lens 110 whose thickness is $t_L$ and focal length is $f_L$. At this point, the central light rays will create a viewpoint at the eye relief $d_e$ distance with the horizontal field of view (FOV) $\theta_v$, and its eye box we is determined by the diffraction angle $\theta_s$. $d_e$, $\theta_v$, and $w_e$ can be calculated using the equations shown in Table 1.

TABLE 1

$$d_e = f_L \frac{w_s}{w_s + 2f_L \tan(\theta_c/2)},$$

$$\theta_v = 2 \tan^{-1}\left(\frac{w_s - t_w \tan(\theta_c/2)}{2d_e}\right), \text{ and}$$

$$w_e = 2 \tan(\theta_s/2)\frac{t_w f_L + d_e f_L - d_e t_w}{f_L},$$

where the thickness of the linear polarizer 108 $t_p$, the quarter-wave plate 112 $t_q$, and the geometric phase lens 110 $t_L$ are neglected. The spatial light modulator 106 creates a three-dimensional (3D) image located behind the spatial light modulator 106 by distance $d_h$. Then the geometric phase lens 110 magnifies the 3D image and moves it back to the perceivable distance $d_i$.

Figure 6A:
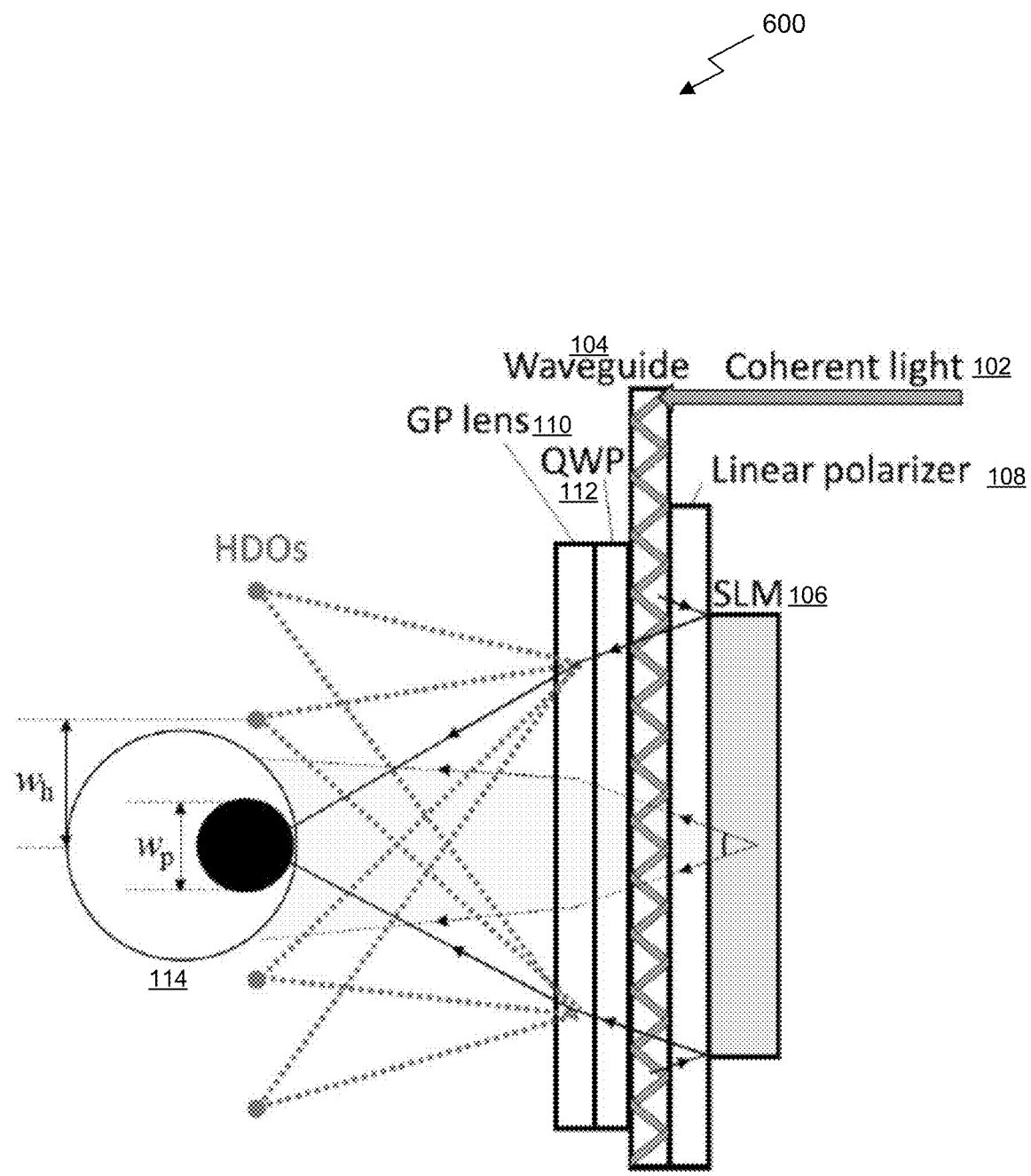
FIG. 6A illustrates an implementation of a VR display having a coherent light source, a pupil replicating waveguide, and a spatial light modulator, where the VR display exhibits high diffraction orders, in accordance with an embodiment.

FIG. 6A illustrates an implementation 600 of a VR display having a coherent light source, a pupil replicating waveguide, and a spatial light modulator, where the VR display exhibits high diffraction orders, in accordance with an embodiment. It should be noted that the aforementioned definitions and/or description may equally apply to the description below.

Implementation 600, as shown, includes the same configuration as implementation 500 of FIG. 5. However, as noted above, implementation 600 illustrates the high diffraction orders (shown as "HDOs") exhibited by such configuration. In particular, the periodic structure of the spatial light modulator 106 pixels can create repeated high diffraction orders, each showing a same holographic image, and they are converged along the pupil plane with the interval of $w_h$ because of the eye piece. If $w_h$ is smaller than the pupil diameter $w_p$, then the HDOs may be considered during the phase calculation process (e.g. high-order gradient descent, or HOGD), as described in more detail below.

In one embodiment, the mismatch of the eye box $w_e$ and the diffraction order repeat spacing $w_h$ may be addressed by choosing the pixel pitch $p_s$ and the focal length $f_L$ to match the eye box $w_e$ and diffraction order repeat spacing $w_h$. By doing so, a continuous eye box can be achieved. However, in this embodiment the intensity of the high diffraction orders may be low compared to the center lobe.

In another embodiment, the viewpoint can be modified on the plane by changing the incident light angle of the light received by the pupil-replicating waveguide 104. This embodiment is shown and described with respect to FIG. 6B.

Figure 6B:
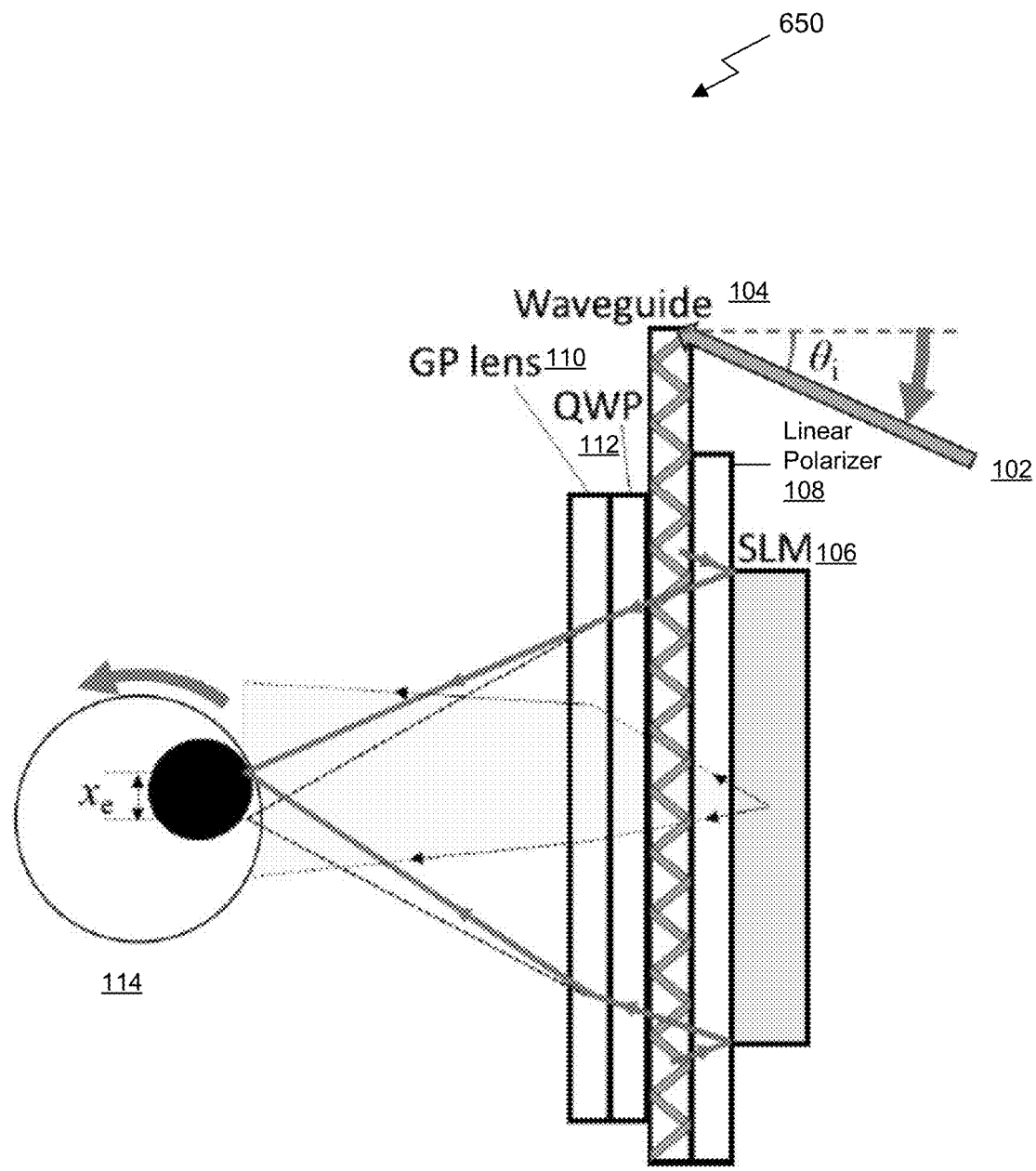
FIG. 6B illustrates an implementation of a VR display having a coherent light source, a pupil replicating waveguide, and a spatial light modulator, where an incident angle of light received by the at least one pupil replicating waveguide is adjustable, in accordance with an embodiment.

FIG. 6B illustrates an implementation 650 of a VR display having a coherent light source, a pupil replicating waveguide, and a spatial light modulator, where an incident angle of light received by the at least one pupil replicating waveguide is adjustable, in accordance with an embodiment. It should be noted that the aforementioned definitions and/or description may equally apply to the description below.

Implementation 650, as shown, has the same configuration as implementation 600, with the exception that the incident light angle of the light received by the pupil-replicating waveguide 104 is adjustable. In particular, since the pupil-replicating waveguide 104 is designed to reproduce a light field with a range of incident light angles ($\theta i$), the direction of entire spatial light modulator 106 illumination can be controlled by the small input beam direction, which results in a dynamic eye box.

In an embodiment, the incident angle of the light may be adjusted according to a current gaze direction of a user utilizing the VR display. In an embodiment, the VR display, or apparatus (e.g. HMD) including VR display, may include a gaze tracking device to determine the current gaze direction of the user. With the gaze tracking device (e.g. camera, sensor, etc.), the apparatus can follow the user's gaze and move around the center lobe by simply changing the direction of the input beam provided by the coherent light source 102.

In an embodiment, the VR display may include at least one beam steering unit (not shown) that is coupled to the pupil replicating waveguide 104 to adjust the incident angle of the light input to the pupil replicating waveguide 104. The beam steering unit may be any device capable of receiving the light from the coherent light source 102 and adjusting the incident angle of the light prior to input to the pupil replicating waveguide 104. For example, the beam steering unit may include an adjustable mirror (e.g. folding mirror) whose position, angle, etc. is adjustable to change the incident angle of the light received from the coherent light source 102 prior to input to the pupil replicating waveguide 104. As another example, the beam steering unit may be a lens shifter. In an embodiment, the beam steering unit may be coupled to an in-coupler of the pupil replicating waveguide 104, which will be described in more detail below with reference to FIG. 7.

Since the VR display is not a Maxwellian view display but instead creates a certain eye box, the VR display may not necessarily be required to precisely redirect the viewpoint to the pupil center all the time. In addition, the required moving part (i.e. the lens beam steering unit) minimally affects the form factor of the VR display. Further, the pupil replicating waveguide 104 has less angular selectivity and can cover wider input k-vector than holographic optical element image combiners. The maximum incident light angle $\theta_{i,max}$ is determined by the pupil replicating waveguide 104 refractive index and the thickness $t_w$, and it is generally enough to cover the user's eye movement.

In some embodiments, there may be design trade-offs for the VR display. For example, field of view $\theta_v$ gets larger when the spatial light modulator 106 size $w_s$ gets bigger, and the eye box $w_e$ gets larger when the spatial light modulator 106 pixel pitch $p_s$ gets smaller. So both $\theta_v$ and $w_e$ are limited by the characteristics of the spatial light modulator 106. For the wearable form factor, the eye relief $d_e$ may be targeted at less than 20 mm. A shorter focal length of eye piece $f_L$ and a larger converging angle $\theta_c$ are beneficial for the wearable form factor. Although short eye relief may be crucial for the wearable form factor and the large field of view, it can cause a small eye box and bring the high orders closer to the center. In turn, the pupil can work as a Fourier filter with a dynamic aperture based on the scene brightness.

If the high diffractive order interval $w_h$ is smaller than the smallest pupil diameter (e.g. 2 mm), then the high diffractive orders may always be observed by the user. In this case, an algorithm can be used to compute a phase pattern to be used by the spatial light modulator 106 to produce a desired output. Initially, a complex wavefront at the spatial light modulator 106 is simulated using a phase pattern and unit amplitude. This is fourier transformed (FT) to move to the frequency domain (referred to as the FFT amplitude and FFT phase). The frequency domain is repeated to produce the higher order copies (i.e. repeating FFT amplitude and FFT phase copies). The propagation is then performed by multiplying the wavefront by a 2D sin c amplitude, which accounts for the finite size of the pixels of the spatial light modulator 106, and an angular spectrum method (ASM) phase delay, thus resulting in the propagation FFT amplitude and propagation FFT phase. The output of the algorithm is computed by converting the propagation FFT amplitude and the propagation FFT phase back from the frequency domain, to produce the propagation amplitude and propagation phase to be used by the spatial light modulator 106.

The use of the repeated frequency domain and the 2D sin c amplitude, together, produce a propagation pipeline that accurately simulates the higher orders. In this way, the spatial light modulator 106 may be optimized with the propagation amplitude and propagation phase such that the desired output is produced by the spatial light modulator 106. Using this algorithm, image quality can be improved when optical filtering is not present in the VR display. Removing the need for the optical filter may in turn enable a more compact VR display without sacrificing image quality. Further, utilizing the light from the higher orders will increase the etendue of the VR display without adding additional hardware components.

If $w_h$ is within the pupil diameter range, then the high diffractive orders could be perceived by the user based on the pupil diameter. On the other hand, if the high diffractive orders are separated enough, then the high diffractive orders may not be seen by the eye of the user (i.e. the user's pupil will work as a "natural" filter and will not view the high diffractive orders), and thus the high diffractive orders and pupil diameter may be disregarded. Since the spatial light modulator 106 may not itself satisfy this condition, a phase generation algorithm may be used which specifically considers the pupil diameter effect, as described below. In an embodiment, this condition can be relaxed with spatial light modulator 106 with a smaller pixel pitch or the scene brightness control.

In an embodiment, a processor (shown in FIG. 9 below) may be included in the VR display, or apparatus (e.g. HMD) including such VR display, for synthesizing a phase pattern of an input image. The phase pattern may in particular be synthesized such that an interval of high diffraction orders is greater than a pupil diameter of a user utilizing the VR display.

In exemplary embodiments, the phase pattern may be synthesized with the HOGD and HOGD-CITL (camera-in-the-loop holography) algorithms. These algorithms model the propagation of high diffraction orders to enable good image quality without optically filtering out the high orders. This high diffraction order propagation detailed in the equations shown in Table 2 may provide good image quality when the pupil collects light from multiple diffraction orders. In this equation, $\phi$ is the spatial light modulator 106 phase pattern, $p_s$ is the spatial light modulator 106 pixel pitch, $\alpha$ is the set of orders to be optimized, $\lambda$ is the wavelength, $z$ is the distance between the spatial light modulator 106 and target plane, and $M_p$ is a pupil mask.

TABLE 2

$$u(\theta; z) = \iint U(f_x, f_y; \phi)A(f_x, f_y; z)e^{i2\pi(f_x x + f_y y)} df_x df_y,$$

$$U(f_x, f_y; \phi) = \sum_{i,j \in a} \mathcal{F}\{e^{i\phi}\}\left(f_x + \frac{i}{p_s}, f_y + \frac{j}{p_s}\right),$$

$$A(f_x, f_y; z) = \mathcal{H}(f_x, f_y; z)\text{Sinc}(\pi f_x p_s)\text{Sinc}(\pi f_x p_s)M_p(f_x, f_y)$$

$$\mathcal{H}(f_x, f_y; z) = \begin{cases} e^{i\frac{2\pi}{\lambda}\sqrt{1-(\lambda f_x)^2-(\lambda f_y)^2}z}, & \text{if } \sqrt{f_x^2 + f_y^2} < \frac{1}{\lambda}, \\ 0 & \text{otherwise.} \end{cases}$$

In these equations, u is the propagated wavefront, U is the frequency representation of the spatial light modulator 106 wavefront with high orders, H is the ASM kernel in the frequency domain, and A is this ASM kernel with attenuation due to the pixel pitch of the SLM and the aperture of the pupil. The aperture of the pupil is accounted for with the masking term, $M_p$, that extends the HOGD algorithm to an algorithm we call Pupil-HOGD. In this algorithm, the pupil mask, $M_p$, enables phase patterns to be optimized while accounting for the wavefront filtering that is performed by the pupil. Here, pupil filtering is modeled for the case that de=fL, where a pupil, with a diameter of $w_p$, acts as a circular filter in the Fourier domain with a diameter of $wp/(\lambda f_L)$. With this, the pupil aperture can be modeled simply by constructing the mask $M_p$ to be 1 for frequencies inside this circular filter and 0 otherwise.

Beyond modeling the pupil aperture, the HOGD and HOGD-CITL algorithms extend to produce phase patterns for RGBD content using a masked multiplane loss, as outlined in the equations shown in Table 3. In these equations, $a_{target}$ is the desired target amplitude and D(x,y) is the desired target depth map. The desired scene is decomposed over J target planes using masks, $m^{(\cdot)}$ that are generated by quantizing the target depth map to the nearest depth, $z^{(\cdot)}$, in the multiplane decomposition.

TABLE 3

$$\arg\min_{\phi,s} \sum_{j=1}^{J} \left\| (s \cdot |u(\phi; z^{(j)})| - a_{target}) \circ m^{(j)} \right\|_2^2$$

$$m^{(j)}(x, y) = \begin{cases} 1, & \text{if } |z^{(j)} - D(x, y)| < |z^{(k)} - D(x, y)|, \forall k \neq j \\ 0, & \text{otherwise} \end{cases}$$

Minimizing this objective produces phase patterns to display desired 3D content. For the multiplane HOGD algorithm, this objective can be directly optimized with the Adam optimizer in Pytorch. The HOGD-CITL algorithm enhances this optimization by pairing the gradients of the simulated propagation with captured outputs of the VR display. These algorithms may be run on an Nvidia™ RTX3090 graphics card with alternating optimization steps for content at each target plane to limit memory usage.

It should be noted that the pupil diameter of the user can be captured and measured using a gaze tracking device, such as an infrared gaze tracker. In reality, the pupil diameter for any user will change as a function of the scene intensity, due to the pupillary reflex (e.g. if the target scene is much brighter than the previous frame, then the pupil-HOGD would not work since the new frame will reduce the pupil size), However, the user's pupil diameter may not necessarily be measured precisely for each image, but instead the user's pupillary reflex may be calibrated as a function of the scene intensity. For example, a model can be calibrated once per user and integrated into the pupil-HOGD as a function of the scene brightness for an optimized viewing experience.

Figure 7:
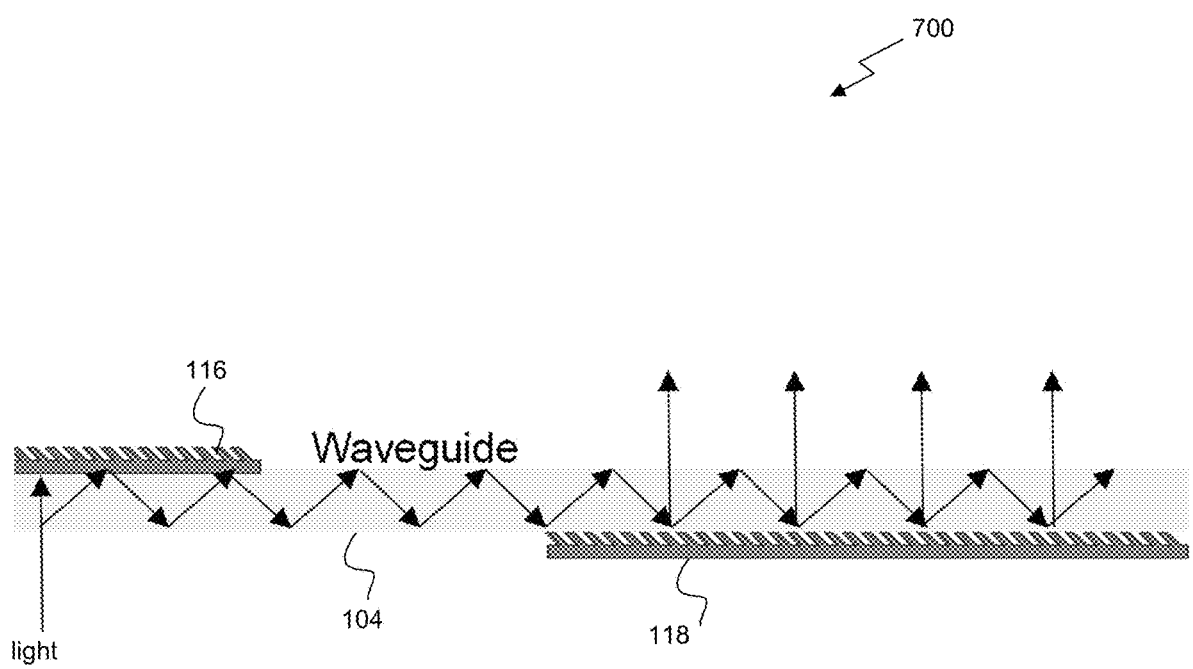
FIG. 7 illustrates an implementation of a pupil replicating waveguide, in accordance with an embodiment.

FIG. 7 illustrates an implementation 700 of a pupil replicating waveguide, in accordance with an embodiment. The pupil replicating waveguide may include pupil replicating waveguide 104 described in the embodiments above. It should be noted that the aforementioned definitions and/or description may equally apply to the description below.

As shown, an in-coupler 116 directs the light (from the coherent light source 102) into the pupil replicating waveguide 104 and an out-coupler 118 directs the light out of the pupil replicating waveguide 104. The pupil replicating waveguide 104 duplicates the in-coupled k-vectors (light) along the out-coupler, as shown.

Figure 8:
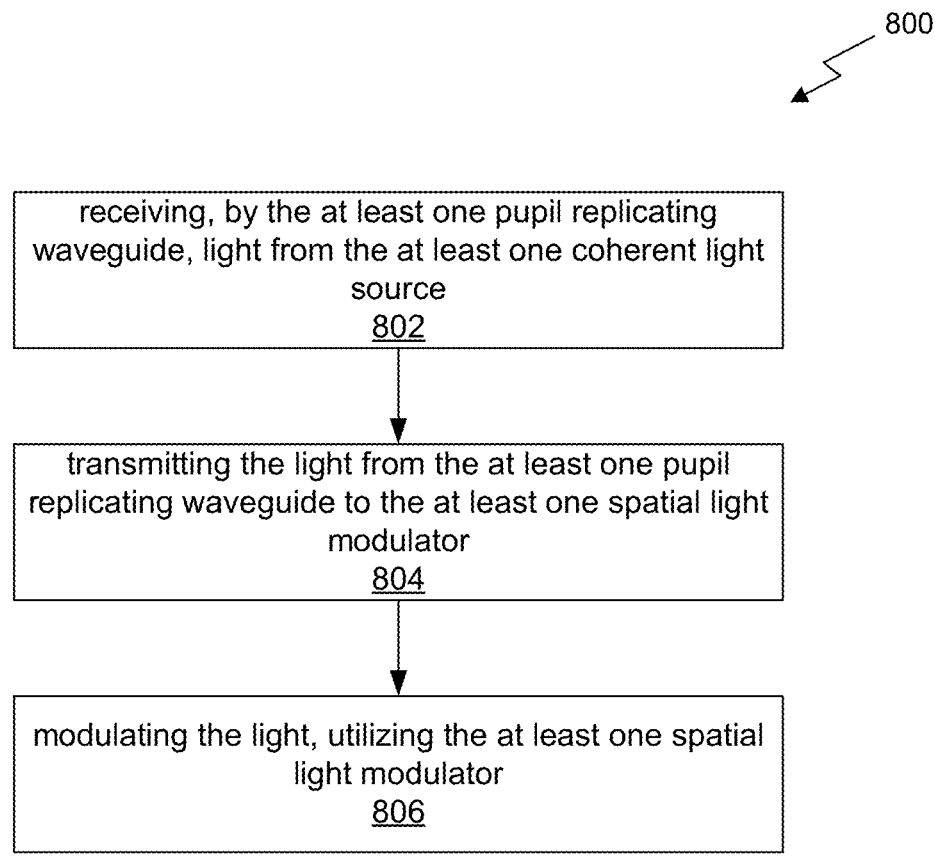
FIG. 8 illustrates a method of operation of a HMD, in accordance with an embodiment.

FIG. 8 illustrates a method 800 of operation of a HMD, in accordance with an embodiment. In one embodiment, the method 800 may be carried out using the implementation 100 of VR display (described in FIG. 1) as the HMD, such that the HMD includes at least one coherent light source, at least one pupil replicating waveguide coupled to the at least one coherent light source, and at least one spatial light modulator coupled to the at least one pupil replicating waveguide.

In embodiments, the HMD may be an augmented reality (AR) display or a mixed reality (MR) display. Thus, HMD may not necessarily be limited to a VR display, but, with a similar configuration to the VR display 100 of FIG. 1, the HMD may also include a camera for capturing live images in order to create AR or MR images and/or video. Of course, any of the embodiments described above with respect to the various Figures may be employed in the context of the HMD performing the present method 800.

In operation 802, light from the at least one coherent light source is received by the at least one pupil replicating waveguide. In operation 804, the light is transmitted from the at least one pupil replicating waveguide to the at least one spatial light modulator. In operation 806, the light is modulated utilizing the at least one spatial light modulator.

In an embodiment, the HMD may further include at least one polarizer (e.g. linear polarizer) coupled to the at least one pupil replicating waveguide. The at least one polarizer may polarize the light in accordance with a polarization of the spatial light modulator. In this embodiment, the method 800 may include polarizing the light output by the at least one pupil replicating waveguide, using the at least one polarizer.

In an embodiment, the HMD may further include at least one lens (e.g. geometric phase lens) coupled to the at least one spatial light modulator. In this embodiment, the method 800 may include polarizing the light, using the lens. As a further option, the HMD may also include at least one quarter wave plate coupled to the at least one lens. In this embodiment, the method 800 may include shifting a phase of the light input to the lens, using the at least one quarter wave plate.

In an embodiment, the HMD may be configured such that an incident angle of the light received by the at least one pupil replicating waveguide is adjustable. In this embodiment, the method 800 may then include adjusting the incident angle of the light according to a current gaze direction of a user utilizing the head-mounted display. In an embodiment, the HMD may include a gaze tracking device to determine the current gaze direction of the user. In another embodiment the HMD may include at least one beam steering unit coupled to the at least one pupil replicating waveguide (e.g. coupled to an in-coupler of the at least one pupil replicating waveguide), whereby the incident angle of the light is adjusted using the at least one beam steering unit.

In an embodiment, the HMD may further include a processor for synthesizing a phase pattern an input image. In this embodiment, the method 800 may include synthesizing the phase pattern the input image, using the processor. In an embodiment, the phase pattern may be synthesized such that an interval of high diffraction orders is greater than a pupil diameter of a user utilizing the head-mounted display.

In yet even a further embodiment, the HMD may include a receiver. In this further embodiment, the method 800 may include receiving, by the receiver, pixel data from a remote source over a network, for display via the HMD. The HMD may perform the method 800 to output the pixel data as a VR image or video for viewing by the user. The remote source may be the exemplary computing system described below with respect to FIG. 9.

Figure 9:
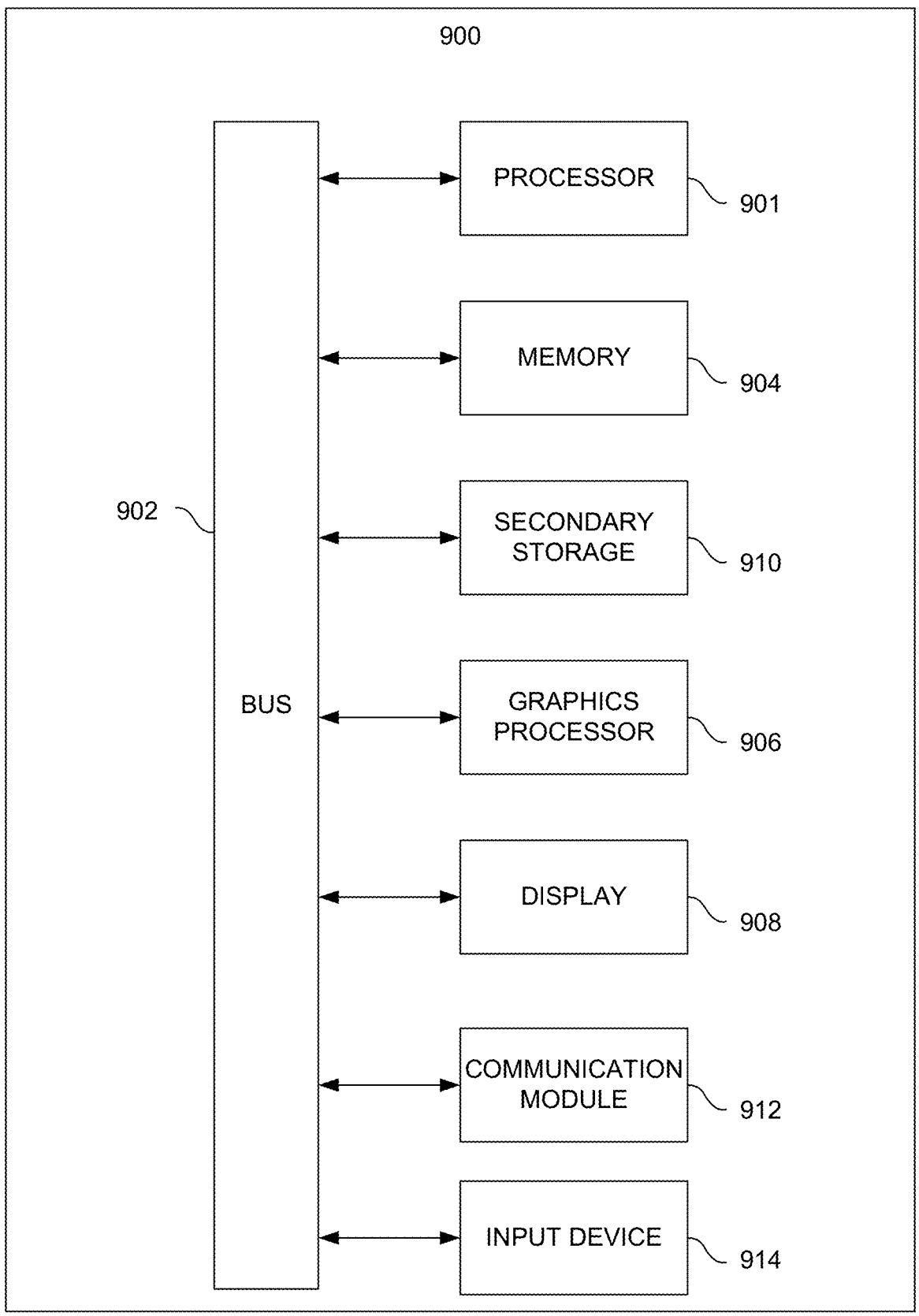
FIG. 9 illustrates an exemplary computing system, in accordance with an embodiment.

FIG. 9 illustrates an exemplary computing system 900, in accordance with an embodiment. The HMD of the method 800 of FIG. 8 (not shown), or the VR display 100 of FIG. 1 or of any other embodiment described above (also not shown), may be in communication with the system 900 to receive output of the system 900 and to provide input to the system 900. Just by way of example, the HMD/VR display may receive from the system 900 virtual images in the form of pixel data. The HMD/VR display and the system 900 may be located in the same environment, or remotely (e.g. the system 900 may be located in the cloud). It should be noted that the HMD/VR display may communicate with the system 900 via a wired connection or a wireless network connection (e.g. WiFi, cellular network etc.). As an option, one or more of the components shown in system 900 may be implemented within the HMD/VR display.

As shown, the system 900 includes at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, a flash drive or other flash storage, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions, including for example calibration of the HMD 102, forming of live video, and coloring of pixels on display 104, as set forth above. The computer programs, when executed, may also enable integration of live video with a virtual environment to provide a modified virtual reality, a mixed reality, or an augmented reality to the user. Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices (e.g. game consoles, personal computers, servers etc.) through a variety of possible standard or proprietary wired or wireless communication protocols (e.g. via Bluetooth, Near Field Communication (NFC), Cellular communication, etc.).

As also shown, the system 900 may include one or more input devices 914. The input devices 914 may be a wired or wireless input device. In various embodiments, each input device 914 may include a keyboard, touch pad, touch screen, game controller, remote controller, or any other device capable of being used by a user to provide input to the system 900.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a virtual reality (VR) display, including:
at least one coherent light source,
at least one pupil replicating waveguide coupled to the at least one coherent light source to receive light therefrom, and
at least one spatial light modulator coupled to the at least one pupil replicating waveguide to modulate the light; and
a processor for synthesizing a phase pattern of an input image, wherein the phase pattern is synthesized such that an interval of high diffraction orders is greater than a pupil diameter of a user utilizing the VR display.

2. The apparatus of claim 1, the VR display further including:
at least one polarizer coupled to the at least one pupil replicating waveguide to polarize the light output by the at least one pupil replicating waveguide.

3. The apparatus of claim 2, wherein the at least one polarizer is a linear polarizer.

4. The apparatus of claim 2, wherein the at least one polarizer polarizes the light in accordance with a polarization of the spatial light modulator.

5. The apparatus of claim 1, the VR display further including:
at least one lens coupled to the at least one spatial light modulator.

6. The apparatus of claim 5, wherein the at least one lens is a geometric phase lens.

7. The apparatus of claim 5, the VR display further including:
at least one polarizer coupled to the at least one lens to polarize the light input to the lens.

8. The apparatus of claim 5, the VR display further including:
at least one quarter wave plate coupled to the at least one lens.

9. The apparatus of claim 1, wherein an incident angle of the light received by the at least one pupil replicating waveguide is adjustable.

10. The apparatus of claim 9, wherein the incident angle of the light is adjusted according to a current gaze direction of a user utilizing the VR display.

11. The apparatus of claim 10, the apparatus further comprising:
a gaze tracking device to determine the current gaze direction of the user.

12. The apparatus of claim 9, the VR display further including:

at least one beam steering unit coupled to the at least one pupil replicating waveguide, wherein the at least one beam steering unit is configured to adjust the incident angle of the light.

13. The apparatus of claim 12, wherein the at least one beam steering unit is coupled to an in-coupler of the at least one pupil replicating waveguide.

14. A method, comprising:
at head-mounted display including at least one coherent light source, at least one pupil replicating waveguide coupled to the at least one coherent light source to receive light therefrom, at least one spatial light modulator coupled to the at least one pupil replicating waveguide to modulate the light, and a processor for synthesizing a phase pattern input image:
receiving, by the at least one pupil replicating waveguide, light from the at least one coherent light source;
transmitting the light from the at least one pupil replicating waveguide to the at least one spatial light modulator;
synthesizing the phase pattern of the input image, using the processor, wherein the phase pattern is synthesized such that an interval of high diffraction orders is greater than a pupil diameter of a user utilizing the head-mounted display;
modulating the light, utilizing the at least one spatial light modulator.

15. The method of claim 14, wherein the head-mounted display further includes at least one polarizer coupled to the at least one pupil replicating waveguide, and the method further comprising:
polarizing the light output by the at least one pupil replicating waveguide, using the at least one polarizer.

16. The method of claim 15, wherein the at least one polarizer is a linear polarizer.

17. The method of claim 15, wherein the at least one polarizer polarizes the light in accordance with a polarization of the spatial light modulator.

18. The method of claim 14, wherein the head-mounted display further includes at least one lens coupled to the at least one spatial light modulator.

19. The method of claim 18, wherein the at least one lens is a geometric phase lens, and the method further comprising:
polarizing the light, using the geometric phase lens.

20. The method of claim 18, wherein the head-mounted display further includes at least one polarizer coupled to the at least one lens, and the method further comprising:
polarizing the light input to the lens, using the at least one polarizer.

21. The method of claim 18, wherein the head-mounted display further includes at least one quarter wave plate coupled to the at least one lens, and the method further comprising:
shifting a phase of the light, using the at least one quarter wave plate.

22. The method of claim 14, wherein the head-mounted display is configured such that an incident angle of the light received by the at least one pupil replicating waveguide is adjustable.

23. The method of claim 22, wherein the method further comprises:
adjusting the incident angle of the light according to a current gaze direction of a user utilizing the head-mounted display.

24. The method of claim 23, wherein the head-mounted display further includes a gaze tracking device to determine the current gaze direction of the user.

25. The method of claim 23, wherein the head-mounted display further includes at least one beam steering unit coupled to the at least one pupil replicating waveguide, wherein the incident angle of the light is adjusted using the at least one beam steering unit.

26. The method of claim 25, wherein the at least one beam steering unit is coupled to an in-coupler of the at least one pupil replicating waveguide.

* * * * *